US008064683B2

(12) United States Patent
Athar

(10) Patent No.: US 8,064,683 B2
(45) Date of Patent: Nov. 22, 2011

(54) VISION-CONTROLLED SYSTEM AND METHOD THEREOF

(75) Inventor: Mohammed Shakir Majeed Athar, Cochin (IN)

(73) Assignee: Wipro Limited, Bangalore, Karnataka (IN)

( * ) Notice: Subject to any disclaimer, the term of this patent is extended or adjusted under 35 U.S.C. 154(b) by 1456 days.

(21) Appl. No.: 11/535,486

(22) Filed: Sep. 27, 2006

(65) Prior Publication Data

US 2008/0075356 A1    Mar. 27, 2008

(51) Int. Cl.
*G06K 9/00* (2006.01)
(52) U.S. Cl. ........ 382/153; 382/100; 382/107; 382/167; 382/236; 382/190; 348/335; 348/61; 348/69
(58) Field of Classification Search .................. 382/100, 382/107, 167, 236, 190; 128/922; 396/135; 348/335, 61, 69; 375/240.01, 240.07; 600/102; 358/426.01
See application file for complete search history.

(56) References Cited

U.S. PATENT DOCUMENTS

| 5,164,827 | A  | * | 11/1992 | Paff .............................. 348/143 |
| 6,102,850 | A  | * | 8/2000  | Wang et al. .................... 600/102 |
| 6,563,533 | B1 | * | 5/2003  | Colby ........................ 348/211.4 |
| 6,998,956 | B2 | * | 2/2006  | Dix ................................. 340/5.2 |
| 7,136,524 | B1 | * | 11/2006 | Goh et al. ..................... 382/167 |
| 2002/0061134 | A1 | * | 5/2002 | Cofer et al. ................... 382/181 |
| 2007/0061041 | A1 | * | 3/2007 | Zweig .......................... 700/245 |

* cited by examiner

*Primary Examiner* — Samir Ahmed
*Assistant Examiner* — Ali Bayat
(74) *Attorney, Agent, or Firm* — Prakash Nama; Global IP Services, PLLC

(57) ABSTRACT

A vision-controlled system and method thereof for detecting changes in a monitoring environment are disclosed. The system includes an image-capturing device for capturing an image; an image analyzer for receiving the captured image and analyzing the same to provide a control signal; and a controller coupled to the image analyzer for receiving the control signal and processing the same.

23 Claims, 4 Drawing Sheets

VISION-CONTROLLED SYSTEM AND METHOD THEREOF

FIELD OF INVENTION

The present invention relates generally to controller systems. More specifically, the present invention relates to control systems based on input binary images.

BACKGROUND OF INVENTION

It is desirable to have control systems that are cost effective and can be deployed for a number of applications. However, most existing control systems are dedicated systems comprising a plurality of dedicated and expensive components. One such control system is a vision system. The vision system used for monitoring an object or environment provides information without physical contacts with the objects or environment being monitored. The vision system typically concerns with image processing which tends to involve complex calculation. Disadvantages with complex calculation include making use of large computer memory and high-speed computing processor in order to provide real-time responses.

Therefore, it is desirable to provide a vision-controlled system that requires substantially less computer memory and nominal speed computing processor.

SUMMARY OF INVENTION

A vision-controlled system and method thereof for detecting changes in a monitoring environment are disclosed. In accordance with a first aspect of the invention, the system comprises an image-capturing device for capturing an image; an image analyzer for receiving the captured image and analyzing the same to provide a control signal; and a controller coupled to the image analyzer for receiving the control signal for controlling actuators. In accordance with a second aspect of the invention, the method comprises receiving an image; comparing the image with a reference image; and generating a control signal based on the outcome of the comparison for controlling actuators.

BRIEF DESCRIPTION OF THE DRAWINGS

Embodiments of the invention are herein described, purely by way of example, with references made to the accompanying drawings, in which.

DETAILED DESCRIPTION OF INVENTION

Figure 1:
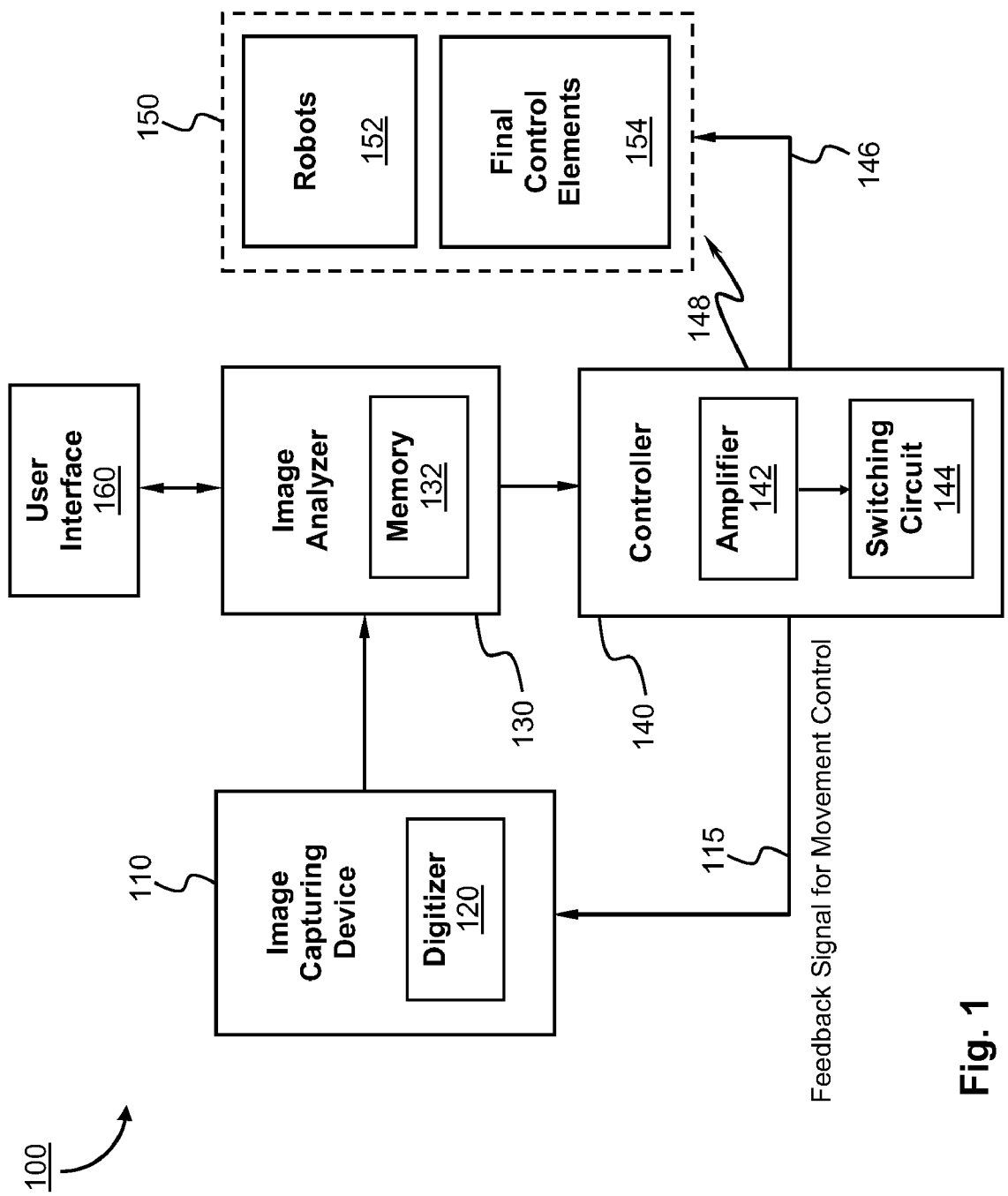
FIG. 1 shows a vision-controlled system according to an embodiment of the present invention.

A vision-controlled system 100 capable of simultaneously monitoring multiple objects and controlling multiple actuators in response to any changes to or movements of the observed objects is shown in FIG. 1. The vision-controlled system 100 includes an image-capturing device 110, an image analyzer 130, a controller 140 and actuators 150. Examples of the actuators 150 include one or more robot 152 and one or more final control elements 154. The final control elements 154 are ON-OFF devices and are responsive to signals from the controller 140. The image-capturing device 110 can be any of known photo sensors such as a digital camera. In an embodiment, the image-capturing device 110 is a low cost, low resolution camera, the like of a web-cam, which has a resolution of 352×288×100,000 pixels and capable of capturing images at 25 frames or more per second. The rate of frame capture determines the frequency or interval at which any changes to the observed objects is analyzed. Thus, the rate of frame capture has bearing on the responsiveness of the vision-controlled system 100 toward any changes to the observed objects in the image frame.

The image-capturing device 110 also includes a digitizer 120 for converting the captured images into equivalent binary images. That is, each pixel of the captured image is rendered black (e.g. a "1") or white (e.g. a "0") depending on the color depth of each pixel of the (original) captured image. Processing binary image provides for simple pixel manipulation and rapid identification as each pixel is either black or white, thus, resulting in substantially faster processing and requiring smaller memory compared to processing a gray scaled or colored image. Further, the binary image alleviates the need for a high-speed computer-processing unit.

Figure 2:
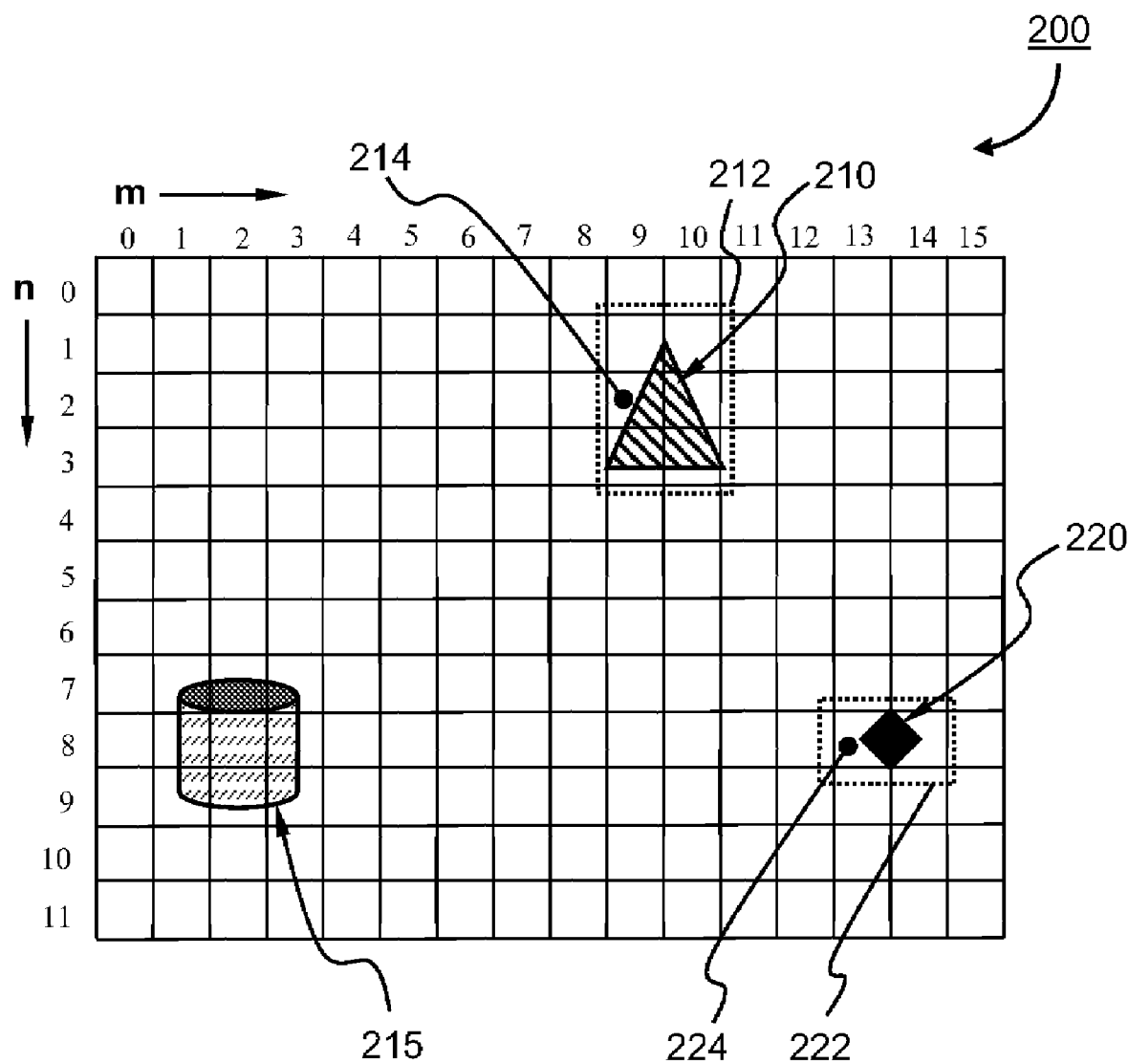
FIG. 2 shows an example of a captured image according to an embodiment of the present invention.

The binary image is fed to the image analyzer 130 where portions of the binary image are analyzed in accordance with a reference image, which is also in the binary format. The binary image can be temporally stored in a memory 132, where the reference image is also stored. The reference image is an image of the observed objects in an initial or desired state. As such, the reference image is divided into different portions with each portion defining a position (or location) of an object of interest in the image to be observed. FIG. 2 shows an example of a captured frame 200 having three observable objects 210, 215 and 220. The pixels making up the frame 200 are arranged in m columns by n rows. Thus, each pixel in the frame 200 can be identified by a coordinate (m, n). In an embodiment, two objects of interest are objects 210 and 220. Object 210 can be defined by portion 212, which is made of six neighboring pixels. Similarly, object 220 can be defined by portion 222, which is made of two neighboring pixels. In an alternative embodiment, object 210 can be defined by portion 214, which is made of one pixel; and object 220 can be defined by portion 224, which is made of one pixel.

Each portion defining the object is given a reference value. In an embodiment, the reference value can be the average of the binary values of all pixels within the portion. For example, in portion 212, pixels (9,1) and (10,1) are white thus having values zeros and pixels (9,2), (10,2), (9,3) and (10,3) are black thus having values ones. Therefore, the average reference value of portion 212 is two-third (i.e. (1+1+1+1+0+0) divided by 6 pixels). In the case where portion 212 is made of one pixel 214 (at coordinate (9,2)), the reference value is one since pixel 214 is black. It should be noted that this is just one exemplary method of determining the values of the portions.

The image analyzer 130 compares values of the portions of the binary image with corresponding reference values of the corresponding portions of the reference image. A change in the value of any of the portions of the binary image indicates that the object defined by the portion is either changed or displaced. In an embodiment, if there is no change in the value of any of the portions of the binary image, no signal is output to the controller 140. In an alternative embodiment, for each analyzed portion of the binary image, if there is a change in the value, an active signal is output to the controller 140. However, if there is no change in the value, a non-active signal is output to the controller 140. The active signal indicates to the controller 140 that the state of the observed object has changed from its initial state. Conversely, the non-active signal indicates to the controller 140 that the state of the observed object remains unchanged. In an embodiment, the active and non-active signals also include information indicating which object the signals are concerned with. In another embodiment, the active and non-active signals can include information indicating which of the actuators 150 are the signals intended for.

In another embodiment, the image analyzer 130 can be instructed to observe portions (or regions) of the binary image where there is no object. In this case, the region of interest in the binary image is merely made up of background images. Thus, when a region of interest is obstructed by a foreground object, for example, an object passing by or an object is placed in the observed region, a change detection is made. This change in the observed region can be used to trigger the actuators 150.

In an embodiment, signals received at the controller 140 are amplified (142) and fed to a switching circuit 144 where the actuators are triggered. The actuators 150 can be coupled to the controller 140 via wired communication connections 146 or wireless communication connections 148 or a combination thereof. Examples of wired communication connections 146 include LAN connections or direction connection such as parallel cable, serial cable, USB connection and FireWire® connection. Examples of wireless communication connections 148 include wireless LAN, Bluetooth®, Wi-Fi, and the like wireless communication protocols.

The selection and usage of the type of actuators 150 is dependent on the nature of the applications. Examples of possible applications include jewel security, where many items can be monitored and multiple alarms can be triggered simultaneously, security systems in museums, automatic simultaneous fluid level control, and robotics control in manufacturing environments. Thus, in an embodiment, the number of objects observable relates closely to the number of pixels in each captured image frame.

According to an embodiment, the image-capturing device 110 is equipped with a motion mechanism (not shown), which is responsive to feedback signals 115 from the controller 140. The feedback signals 115 are for controlling the movement of the image-capturing device 110 to change the viewing angle thereof. The feedback signals 115 can be transmitted from the controller 140 to the image-capturing device 110 either by using a wired communication connection or a wireless communication connection.

Figure 3:
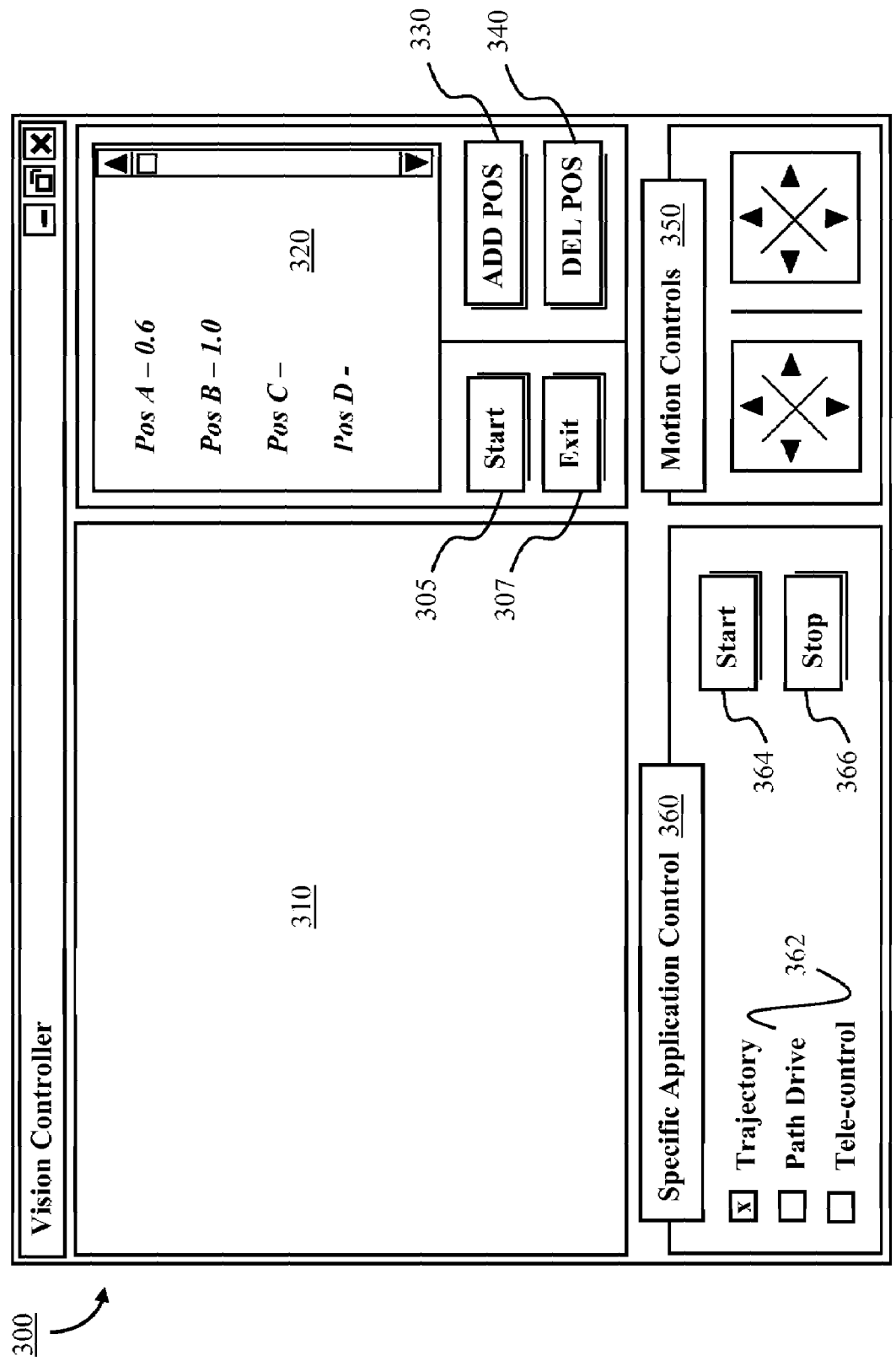
FIG. 3 shows an example of a user interface of the vision-controlled system according to an embodiment of the present invention.

In an embodiment, the vision-controlled system 100 also includes a user interface 160 coupled to the image analyzer 130. Images output from the digitizer 120 can be displayed on the user interface 160 to provide a visual feedback to operators. Among other things, the user interface 160 also enables the operators to identify objects of interest in the images (i.e. object selection) and linking each of the identified objects to corresponding actuators 150. An exemplary user interface 300 is shown in FIG. 3. The user interface 300 includes a start button 305, an exit button 307, an image window 310 where the images output from the digitizer 130 are displayed and a data-logging window 320 where any changes to the values of the portions of the binary image are logged. Upon pressing the start button 305, the image-capturing device 110 captures an image, which is processed by the digitizer 120 and subsequently displayed in the image window 310. The user interface 300 also includes controls for identifying new objects (ADD POS button 330) in the binary image to be monitored and removing objects (DEL POS button 340) from being monitored. Upon pressing the ADD POS button 330, the operator is provided with an option to identify an object of interest in the displayed image for monitoring. The option can be provided in the form of a changed cursor to indicate object selection mode. The object is identified by the operator selecting a portion of the displayed image that represents the object of interest. As described in the foregoing, the portion can be a group of neighboring pixels or a single pixel. The newly selected portion is given a name and thereafter listed in the data-logging window 320 along with the value (reference value) of the selected portion. The operator is also provided with an option to link the newly selected portion to one or more actuators. In an embodiment, the user interface 300 also includes a motion controller 350 for manually controlling the robots 152 or the viewing angle of the image-capturing device 110.

Further, a specific application control 360 can be provided to allow for specialized applications such as object trajectory tracking, automatic path-detection driving and virtual tele-surgery simulation. The specific application control 360 includes application selection options 362, an application start button 364 and an application stop button 366. In the exemplary example of the object trajectory tracking, once the operator has selected the trajectory tracking application, the operation is requested to define the object intended for tracking. In this case, the object is defined by selecting two portions of the pixels of the image (displayed in the image window 310) corresponding to two extreme ends of the object. It should be noted that more than two portions of the object outline can be defined and that each defined portion can consists of either one pixel or a number of neighboring pixels. Upon pressing the application start button 364, the image-capturing device 110 tracks the movements of the object by analyzing the defined portions of the pixels and sending corresponding signals to the controller 140 to control the movement of the image-capturing device 110 via feedback signals 115. Tracking the movements of the object can be achieved by using an 'AND' logic to ensure that the define portions are consistently dark, which indicates the presence of the object. For example, when the value of the right extreme end of the object changes state (i.e. becomes white), it indicates that the object has moved to the right. Thus, a corresponding feedback signal is to control the image-capturing device 110 to move an increment to the right to compensate for the movement of the object. In similarly manner, the movements of the object to the left, up and down can also be detected and compensated. Pressing the application stop button 366 halts the object movement tracking.

Figure 4:
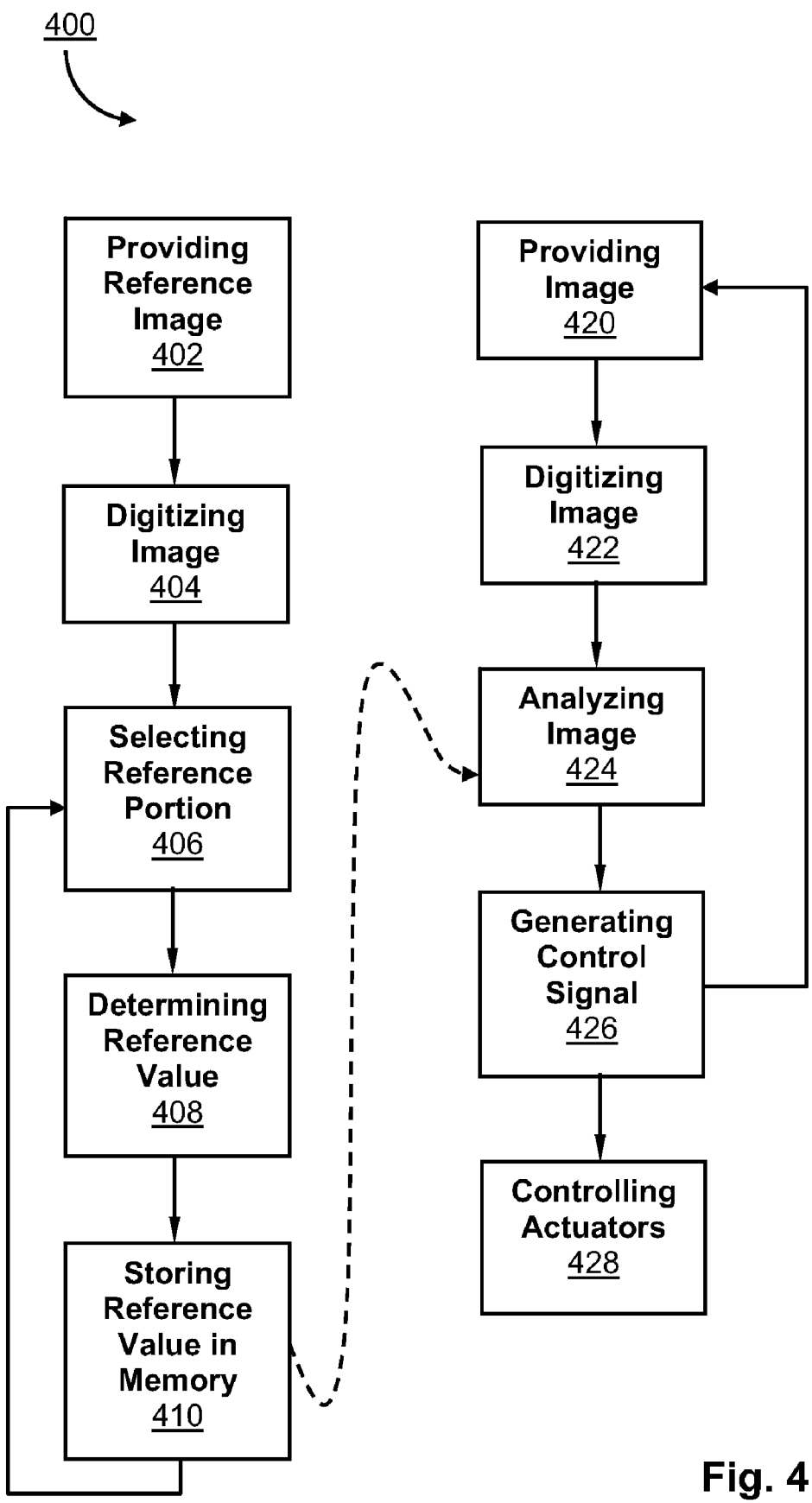
FIG. 4 shows a flowchart depicting steps for working the vision-controlled system according to an embodiment of the present invention.

FIG. 4 shows a flowchart 400, according to an embodiment, depicting steps of working the vision-controlled system 100. In step 402, an image of interest is provided for use as a reference image. The reference image is digitized in step 404. The digitizing step 404 involves converting the input reference image into a reference binary image wherein each pixel therein is rendered either black or white depending on the color depth of the pixel. The reference binary image is subsequently displayed on a user interface (such as the user interface 300 shown in FIG. 3) so that an operator can identify objects captured in the reference binary image for monitoring purposes. In step 406, the operator identifies an object of interest by selecting a portion of the reference binary image representing the object. The portion, which is a reference portion representing the object of interest, can be either a pixel or multiple pixels in size. Once the reference portion is identified, a reference value based on the reference portion is determined in step 408. In an embodiment, as each pixel is with black or white, a simple way for determining the value of the reference portion is to count the number of black and white pixels in the portion. In another embodiment, the value of the reference portion can be an average of the binary values of all the pixels in the reference portion. In step 408, the identified reference portion can be linked to one or multiple actuators. The reference value, reference portion and identities of actuators linked thereto are then stored in a memory along with the reference portion in step 410.

If there are more than one objects of interest, more reference portions can be selected from step 406. Once the objects of interest are identified, the monitoring process can commence. Typically, this involves providing a fresh image in step 420. The image is subsequently digitized in step 422 to provide a binary image. The binary image is subsequently analyzed in step 424. In this step 424, portions of the binary image are identified in accordance with the reference portions stored in the memory. Values of the identified portions are subsequently determined and compared with the corresponding reference values stored in the memory. Depending on the outcome of the comparison, corresponding control signals are generated in step 426. In an embodiment, if a value of an identified portion is substantially the same as a corresponding reference value, no control signal need to be generated. However, if the value of the identified portion is substantially different from the corresponding reference value, an active signal is generated. The active signal indicates a change in the observed area or object has occurred. In an alternative embodiment, if the value of the identified portion is substantially the same as the corresponding reference value, a non-active signal is generated; otherwise, an active signal is generated. The generated signals are subsequently sent to corresponding actuators to trigger the actuators to perform a pre-determined task in step 428. In step 426, once the control signals are generated, the monitoring process can be repeated from step 420 until it is terminated.

While the present invention has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example and is not to be limited to the details given herein, but may be modified within the scope and equivalents of the appended claims.

The invention claimed is:

1. A system comprising:
   an image-capturing device for capturing an image and converting the captured image into a binary image;
   an image analyzer for receiving the binary image and analyzing the binary image by comparing the binary image with a reference binary image stored in a memory to generate a control signal, wherein comparing the binary image with the reference binary image comprises:
       selecting a portion of the binary image based on a reference portion of the reference binary image, wherein the portion comprises a plurality of pixels, each pixel having a pixel value;
       determining a portion value of the selected portion, wherein the portion value being an average of the pixel value of the plurality of pixels within the portion; and
       comparing the portion value with a reference portion value of the reference portion; and
   a controller coupled to the image analyzer for receiving the control signal and processing the same, wherein the image-capturing device comprises a motion mechanism responsive to a feedback signal provided by the controller for controlling movement of the image-capturing device.

2. The system of claim 1, wherein the image-capturing device is a web-cam.

3. The system of claim 1, wherein the image-capturing device comprises a digitizer for providing the binary image based on the captured image.

4. A method for controlling movement of an image-capturing device and one or more actuators, comprising:
   capturing an image by the image-capturing device and converting the captured image into a binary image;
   receiving the binary image and analyzing the binary image by comparing the binary image with a reference binary image stored in a memory to generate a control signal by an image analyzer, wherein comparing the binary image with the reference binary image comprises:
       selecting a portion of the binary image based on a reference portion of the reference binary image, wherein the portion comprises a plurality of pixels, each pixel having a pixel value;
       determining a portion value of the selected portion, wherein the portion value being an average of the pixel value of the plurality of pixels within the portion; and
       comparing the portion value with a reference portion value of the reference portion; and
   receiving the control signal and processing the control signal by a controller, wherein the image-capturing device comprises a motion mechanism responsive to a feedback signal provided by the controller for controlling the movement of the image-capturing device.

5. The method of claim 4, wherein the pixel value being a ONE or ZERO.

6. The method of claim 4, wherein generating the control signal comprises:
   providing an active signal upon finding the portion value substantially different from the reference portion value; and
   providing a non-active signal upon finding the portion value substantially same as the reference portion value.

7. The system of claim 1, wherein the image analyzer generates the control signal based on the outcome of the comparison.

8. The system of claim 1 further comprising a plurality of actuators coupled to the controller, the controller comprising a switching circuit for simultaneously controlling the plurality of actuators based on the control signal.

9. The system of claim 1 further comprising an actuator coupled to the controller, wherein the controller sends the control signal to the actuator to trigger the actuator to perform a pre-determined task.

10. The system of claim 9, wherein the actuator comprises a robot.

11. The system of claim 9, wherein the actuator comprises a final control element.

12. The system of claim 9, wherein the actuator being coupled to the controller using a wired connection.

13. The system of claim 9, wherein the actuator being coupled to the controller using a wireless connection.

14. The system of claim 1 further comprising a user interface having an image window for displaying the image.

15. The system of claim 14, wherein the user interface further comprising controls for establishing reference portions of the image for use by the image analyzer.

16. The system of claim 1, wherein generating the control signal comprises:

providing an active signal upon finding the portion value substantially different from the reference portion value; and providing a non-active signal upon finding the portion value substantially same as the reference portion value.

17. The system of claim 1, wherein the feedback signal is transmitted from the controller to the image-capturing device using a wired communication connection or a wireless communication connection.

18. The method of claim 4, wherein
the control signal is generated based on the outcome of the comparison.

19. The method of claim 4, wherein the feedback signal is transmitted from the controller to the image-capturing device using a wired communication connection or a wireless communication connection.

20. The method of claim 4 further comprising activating a plurality of actuators simultaneously based on the control signal.

21. The method of claim 4 further comprising activating an actuator using the control signal.

22. The method of claim 21, wherein activating the actuator comprises sending the control signal to the actuator using a wired connection or a wireless connection to trigger the actuator to perform a pre-determined task.

23. The method of claim 4 further comprising providing a user interface, the user interface comprising an image window for displaying the image, and controls for establishing reference portions of the image for use by the image analyzer.

* * * * *